Oct. 15, 1940.　　W. A. SCHEUCH　　2,217,847
SOLDERING FLUX
Filed Feb. 23, 1939
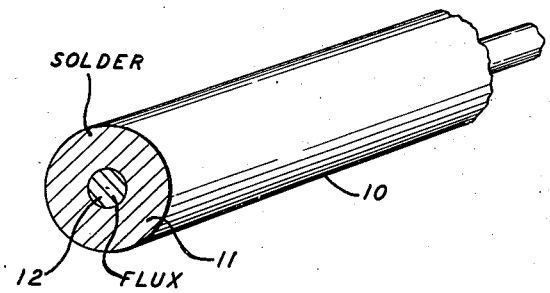
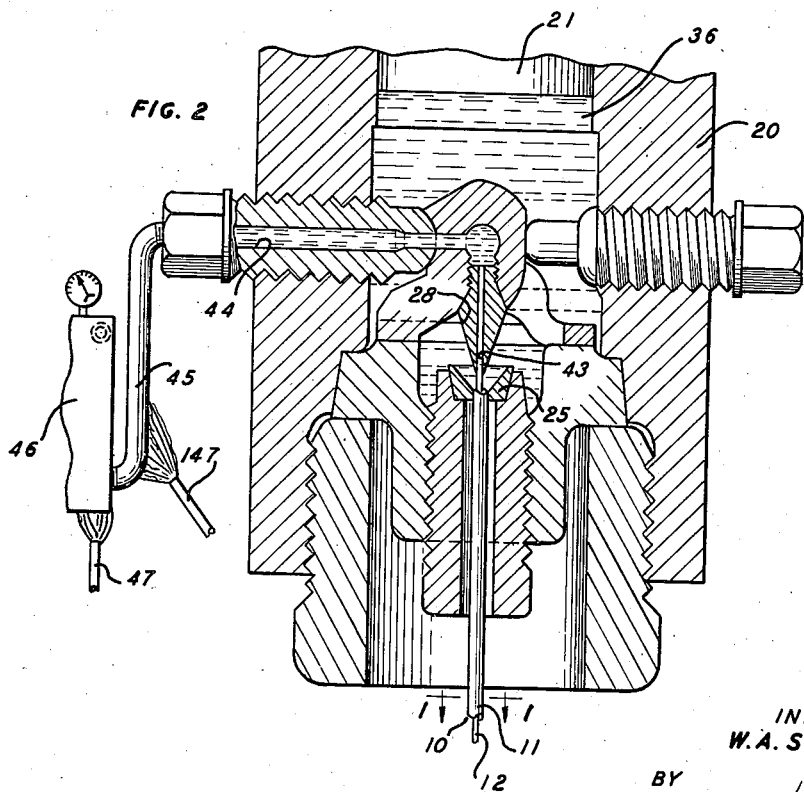
INVENTOR
W. A. SCHEUCH
ATTORNEY Patented Oct. 15, 1940

2,217,847

UNITED STATES PATENT OFFICE 2,217,847

SOLDERING FLUX

William A. Scheuch, Great Kills, Staten Island, N. Y., assignor to Nassau Smelting & Refining Company, Incorporated, New York, N. Y., a corporation of New York Application February 23, 1939, Serial No. 257,851

10 Claims. (Cl. 148—23)

This invention relates to soldering fluxes and to cored solder made therewith, more particularly to soldering fluxes comprising naturally plastic materials and to cored solders employing such fluxes.

Cored solders, that is, tubes of metallic solder filled with flux, suitable for many uses have been known for a considerable length of time. Ordinarily such solders are filled with a flux consisting of rosin alone or of rosin mixed with some plasticizing agent, such as rosin oil, turpentine or the like. Such cored solders are a great convenience in ordinary soldering operations, the flux being thus carried with the solder directly to the part or point where a soldered connection is to be made. Also, such cored soldered strands have been used in electrical safety apparatus in which an excessive current beyond a predetermined value passing through such a strand will melt the strand and thus break the circuit and prevent damage from electrical overloading.

When rosin alone is used as the core material it may be unsatisfactory for various purposes because of the brittle and friable nature of the rosin. If such rosin cored soldered strand is bent or crushed in any way, the core material at that point is powdered and may hence be unsatisfactory for some purposes. Furthermore, the rosin is liable to come out of the end of the solder tube. For this reason cored solders are made in which the rosin is plasticized with rosin oil, turpentine or the like. However, it is found that in some cases such cored solders when used under conditions of high temperature will become unsatisfactory because of the excessive softening or even melting of the plasticized core.

The objects of the present invention are to provide flux cored solders having cores of material which are satisfactory both as to their mechanical characteristics and fluxing properties and to provide new and improved soldering fluxes.

In one embodiment of the present invention a tubular strand of solder is filled with a core made of gum or resinous material which is naturally and normally plastic under ordinary temperatures without involving the need for any foreign plasticizing ingredient. It has been found that suitable natural gums or resins for this purpose are such gums as gum thus, gum elemi, and the naturally plastic forms of resins which are extracted from crude gutta perchas and balatas.

Other objects and features of the invention will appear from the following detailed description of one embodiment thereof taken in connection with the accompanying drawing, in which the same reference numerals are applied to identical parts in the several figures and in which—

Fig. 1 is an enlarged diagrammatic perspective view of a section of cored solder made in accordance with the present invention; and Fig. 2 is a fragmentary sectional view of a portion of an extrusion press for manufacturing the product shown in Fig. 1.

In the embodiment herein disclosed a strand 10 of cored solder comprises a metallic tube 11 of solder and a plastic core 12. The shell 11 is a tube preferably having a wall of uniform thickness and consisting of any suitable metal or metallic alloy, such as the various alloys of lead and tin commercially known as common solder or in some instances of other metallic alloys such as Wood's metal, Rose's metal, or the like. The core 12, preferably formed to fill the cylindrical bore of the body 11 in accordance with the present invention, consists substantially entirely of a gum or resin which is itself naturally plastic at ordinary temperatures, requiring no plasticizing agent to render it plastic.

One natural resin or gum which has been found to be eminently satisfactory both because it is a suitable flux for soldering operation and because it is naturally plastic at ordinary temperatures is the resin known as gum thus, a resinous exudation from the long-leaf pine tree, *Pinus palustris*, which grows in the southern United States. This particular resin is scraped from the trees after the first frost and differs from similar materials in that it is naturally plastic at ordinary temperatures.

Another suitable natural resin for this purpose is that known as gum elemi, a natural resin obtained from a variety of sub-tropical or tropical plants, e. g., those known as *Icica icicariba*, *Elaphrium elemiferum* and *Canarium commune*. The resin which has been found to be most satisfactory is the variety obtained principally from the Philippine Islands and sold under the name of Manila elemi. The gum elemi that is suitable for the purpose of this invention is characterized by being naturally or normally plastic at ordinary temperatures and is an excellent flux for soldering operations.

A third type of material which has been found to be satisfactory comprises the plastic resins which occur as a natural admixture or impurity in crude gutta perchas and balatas and which are extracted therefrom by means of suitable solvents, such as gasoline, naphtha, etc. One material of this nature, which is plastic at ordinary temperatures and acts as a soldering flux, is known commercially as G. P. resin.

One convenient method of making the product shown in Fig. 1 is illustrated by Fig. 2 of the drawing. This figure is a sectional view of a portion of the apparatus invented by L. S. Deitz, Jr., which is completely disclosed and claimed in United States Patent 2,073,465 issued March 9, 1937. In this apparatus the resinous material is contained in a tank 46 and is heated by a flame 47 or by other means to maintain it in a fluid condition. From this tank it is forced through a pipe 45, which may be heated, if necessary, by means of a flame 47, and through channels 44 and 43, leading finally from the lower end of a nozzle 28 the outlet end of which is positioned within the entrance opening of an extrusion die 25. A solder 36, of any suitable composition, is contained in an extrusion cylinder 20 and while in a plastic state is forced by means of a ram 21 through the die 25. Thus the solder is caused to issue from the press as a tube 11 enclosing the core 12 of the plastic gum material, thereby forming the compound strand 10 consisting of the shell or tube 11 of solder and the plastic core 12.

While the invention has been illustrated as embodied in a strand of cored solder consisting of a solder shell with a plastic gum core, the invention is not limited to the precise structure and ingredients shown but is limited only by the appended claims. For example, the solder may be in the form of hollow pellets of various shapes, which completely enclose the plastic core. Such pellets may be round, oblong or of any desired shape. Also, if desired, the tubular shell of the cored strand solder may be crimped at intervals in a manner well known in the art to provide a plurality of chambers enclosing batches of the plastic core. In addition, the shell in the strand form of the cored solder need not be in the form of a hollow circular cylinder, but may assume any desired form.

Furthermore, other naturally plastic gums or resins which have the property of acting as a soldering flux may be substituted for those specifically recited herein. Mixtures of these naturally plastic materials with each other or with other materials may likewise be used, if desired, provided the mixtures used are plastic at ordinary temperatures. Obviously, these naturally plastic gums or resins need not be used solely as cores for cored solder but may be used in various forms for soldering operations in the same manner that rosin may be employed.

What is claimed is:

1. A plastic soldering flux consisting essentially of material selected from the class consisting of gum thus, gum elemi and gutta percha and balata resins which is normally plastic at ordinary temperatures without the admixture of any plasticizing agent.

2. A plastic soldering flux consisting essentially of gum thus which is normally plastic at ordinary temperatures without the admixture of any plasticizing agent 3. A plastic soldering flux consisting essentially of gum elemi which is normally plastic at ordinary temperatures without the admixture of any plasticizing agent.

4. A plastic soldering flux consisting essentially of G. P. resin which is normally plastic at ordinary temperatures without the admixture of any plasticizing agent.

5. A plastic flux core for bodies of cored solder, consisting essentially of material of the class consisting of gums and resins which are normally plastic at ordinary temperatures without the admixture of any plasticizing agent and which are capable of acting as soldering fluxes.

6. A plastic flux core for bodies of cored solder, consisting essentially of material normally plastic at ordinary temperatures without the admixture of any plasticizing agent and selected from the class consisting of gum thus, gum elemi and gutta percha and balata resins.

7. A plastic flux core for bodies of cored solder, consisting essentially of gum thus which is normally plastic at ordinary temperatures without the admixture of any plasticizing agent.

8. A plastic flux core for bodies of cored solder, consisting essentially of gum elemi which is normally plastic at ordinary temperatures without the admixture of any plasticizing agent.

9. A plastic flux core for bodies of cored solder, consisting essentially of G. P. resin which is normally plastic at ordinary temperatures without the admixture of any plasticizing agent.

10. A plastic soldering flux constisting essentially of material normally plastic at ordinary temperatures without the admixture of any plasticizing agent and selected from the class consisting of gums and resins normally plastic at ordinary temperatures without the admixture of any plasticizing agent and which are capable of acting as soldering fluxes.

WILLIAM A. SCHEUCH.